Feb. 24, 1948.　　　G. B. NICHOLS　　　2,436,446
CALENDERING AND APPARATUS THEREFOR
Filed Aug. 3, 1944　　　3 Sheets-Sheet 1
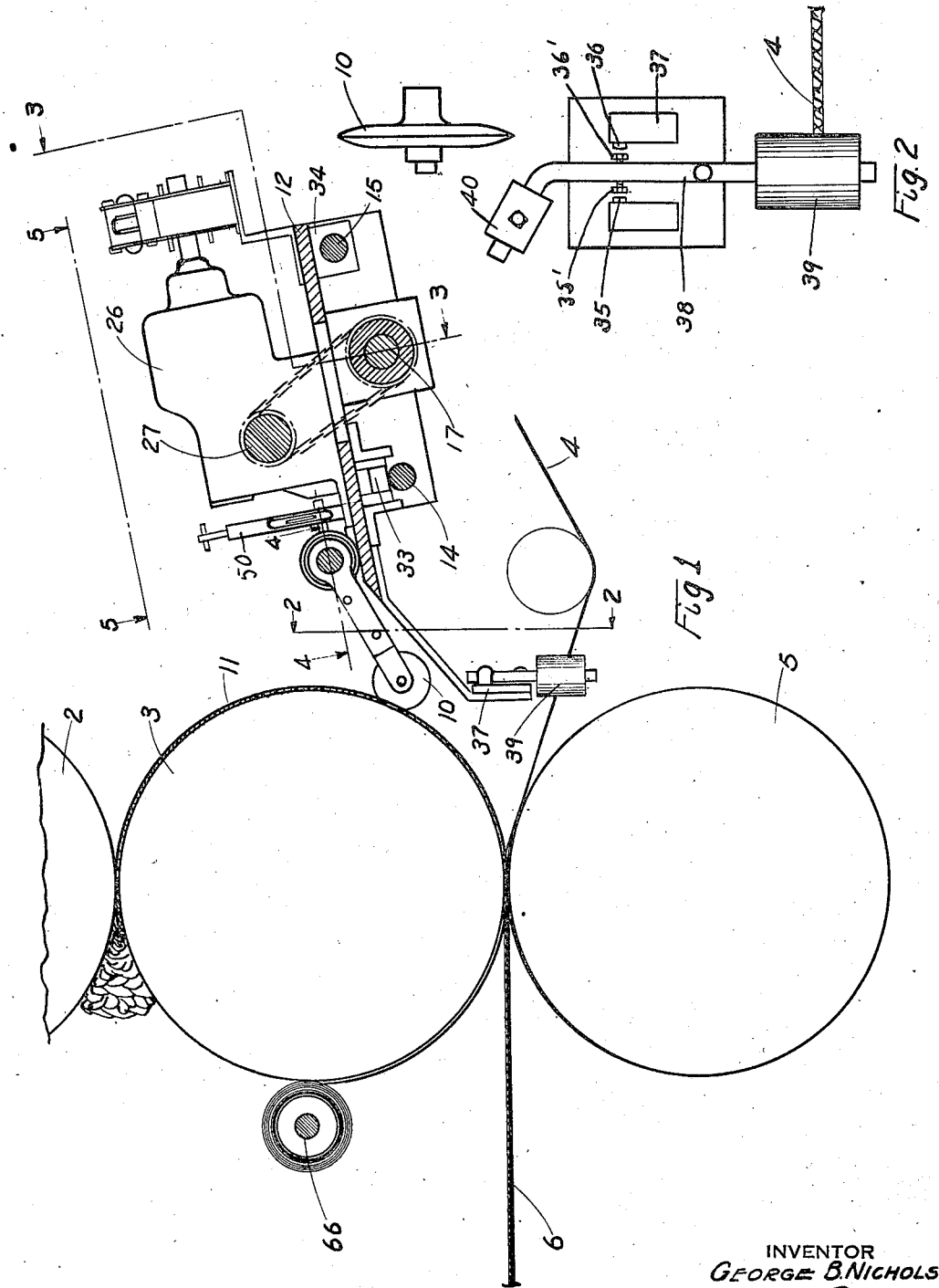
INVENTOR
GEORGE B. NICHOLS.
BY
ATTORNEY

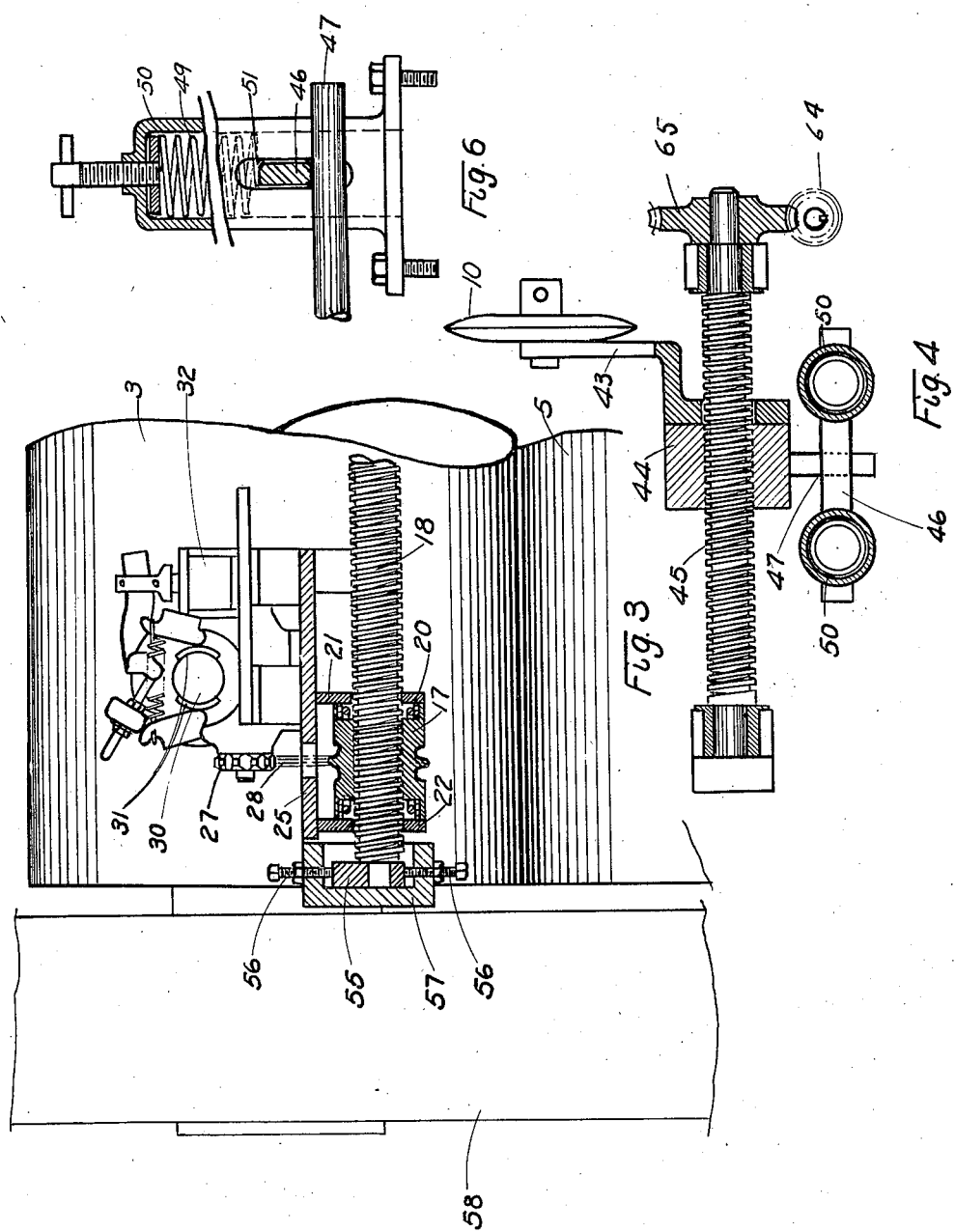

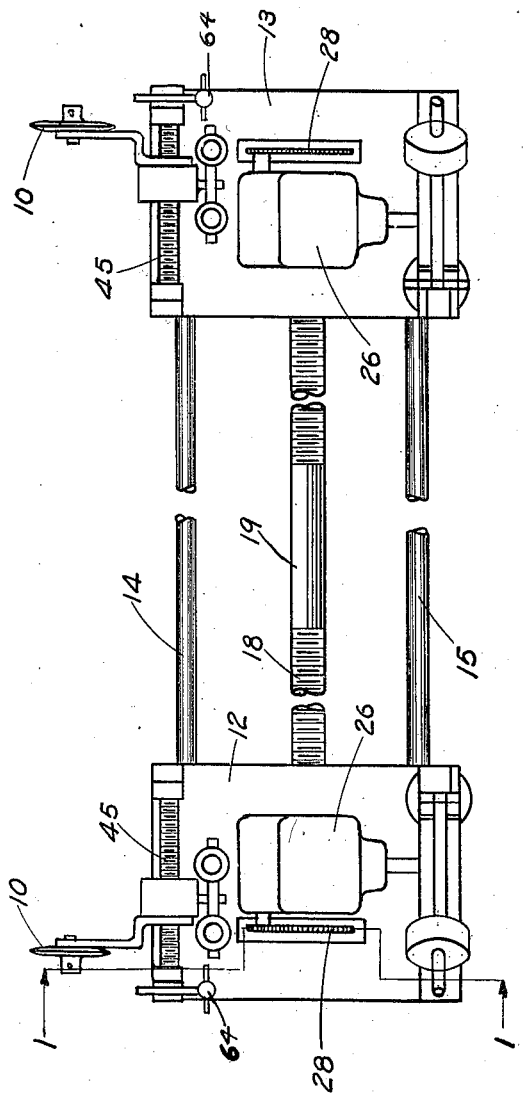

Patented Feb. 24, 1948

2,436,446

UNITED STATES PATENT OFFICE 2,436,446

CALENDERING AND APPARATUS THEREFOR

George B. Nichols, Barberton, Ohio, assignor to Seiberling Rubber Company, Barberton, Ohio, a corporation of Delaware Application August 3, 1944, Serial No. 547,925

4 Claims. (Cl. 117—110)

This invention relates to an improved method of calendering rubber and like plastics onto a fabric. It includes the improved method of calendering and apparatus therefor.

It has been customary in the manufacture of tires and other rubber products to calender the rubber onto the fabric by sheeting the rubber out on one calender roll and then passing the sheet of rubber and the fabric between this and an adjacent roll. The sheet of rubber on the calender roll has invariably been wider than the fabric, and the excess has been trimmed from the calendered fabric in numerous ways. For example, in certain plants it has been customary to remove the excess rubber from calendered cord fabric by removing several of the selvage cords from the fabric, taking with them the excess rubber, thus narrowing the rubber ply to the width of the remaining fabric. All such methods of removing the excess rubber are wasteful.

According to this invention the rubber is sheeted out on one of the calender rolls, and then it is trimmed along a line which parallels the edge of the fabric just before the fabric is brought into contact with it. It may be trimmed to the exact width of the fabric, or the rubber may be wider or narrower than the fabric, as desired. The width of the fabric varies somewhat, and the fabric shifts from side to side as it passes between the calender rolls so the knives which trim the rubber sheet are moved from side to side to follow the edges of the fabric, and the trimmed edges of the rubber sheet at all times parallel the edges of the fabric as the rubber and fabric pass between the calender rolls. It is thus possible to calender the rubber onto the fabric without any waste whatever. The rubber trimmed from the edges of the plastic sheet is fed back to the bank of rubber between the calender rolls. This avoids waste of rubber and waste of fabric. It also eliminates the usual extra step of trimming the edges of the calendered fabric to the desired width and the disposal of the scrap.

Although, in general, it will be desirable to have the edges of the rubber sheet coincide with the edges of the fabric, at times it will be desirable to have the rubber sheet somewhat wider or narrower than the fabric, or the same width but offset so that the edges do not coincide. For instance, in the manufacture of tires from natural rubber, instead of using a gum strip, the edge of the rubber sheet may be made to project a fraction of an inch over the edge of the fabric ply, and in this case the edge of the sheet is preferably skived. Also, in the manufacture of flooring, the rubber sheet which is to be calendered to the fabric base is advantageously cut somewhat wider than the fabric, but with its edge parallel to the fabric so that in the finished flooring there is a border of rubber of uniform width on each side of the flooring. So far as this invention is concerned, the principle is the same whether one or both the edges of the rubber sheet coincide with the edges of the fabric or are merely parallel to them without coinciding.

The invention will be further explained in connection with the accompanying drawings in which Fig. 1 is an elevation, partly in section, of the equipment taken on the line 1—1 of Fig. 5; Fig. 2 is a view on the line 2—2 of Fig. 1 showing the knife and guide means, which latter follows the edge of the fabric; Fig. 3 is a view on the line 3—3 of Fig. 1; Fig. 4 is a detail plan view showing the arrangement for holding the knife, taken on the plane 4—4 of Fig. 1; Fig. 5 is a plan view on a smaller scale showing the knives on opposite sides of the fabric and, for the sake of clarity, omitting the guide rollers; and Fig. 6 is a detail, partly in section, showing the spring arrangement for holding the knife against the calender roll. In the drawings the knife is adjusted so that the rubber sheet is trimmed to exactly coincide with the edge of the fabric.

The usual type of three-roll calender is illustrated in the drawings in which the bank of rubber 1 is built up between the rolls 2 and 3, and the fabric 4 is fed between the rolls 3 and 5 to produce the finished calendered sheet 6.

In the type of equipment shown the knife 10, which trims the sheet of rubber 11 as it is carried on the roll 3, is supported by the carriage 12, which is moved back and forth across the front of the calender roll to follow the edge of the fabric as it moves from side to side just prior to its entering between the calender rolls 3 and 5.

Fig. 5 illustrates two such carriages 12 and 13 located toward opposite ends of the calender rolls. The two carriages are exact duplicates, but opposites of one another, and move independently of one another. They are supported by the tie rods 14 and 15, and, as shown most clearly in Fig. 3, they are moved from left to right and right to left by the revolution of the nut 17 as it is turned one way or the other along the stationary threaded shaft 18. The shaft 18 is threaded at both ends, but there is a small length of shaft 19 in the center which is not threaded. Stop switches (not shown) are provided to prevent either carriage from moving too far toward the center of the calender, and other switches (not shown) prevent either carriage from moving too far toward the edge of the calender.

The nut 17 is flanked by thrust bearings 20 between the plates 21 and 22 which are fastened to the platform 25. The nut is driven by the motor 26, the sprocket 22 of which is connected with the nut by the drive chain 28. The motor is equipped with a rotor 30 and brake shoes 31 which are applied to the rotor at all times, except when the solenoid 32 is actuated. The solenoid is connected in series with the lines which supply current to the motor so that when current is supplied to the motor for rotation in either direction, the solenoid is actuated, and the brakes are released. The brakes are applied immediately whenever the current is shut off.

Rollers 33 support the rear of the carriage as it rolls along the tie rod 14, and the sleeves 34 which slide along the tie rod 15 prevent the pressure of the knife 10 against the calender from raising the front of the carriage from the tie rod 15.

The microswitches 35 and 36 (Fig. 2) which are actuated by the set screws 35' and 36' operate the motor in either one direction or the other to cause each knife to follow its edge of the fabric. These switches are mounted on the panel 37 which is suspended from the underside of the carriage by a suitable bracket. The pivot for this shaft 38 which supports the guide roller 39 is a large ball bearing. The guide roller rolls against the edge of the fabric 4. As the width of the fabric varies or the position of the fabric between the calender rolls varies as it shifts from side to side, the roller is moved to one side or the other, and this closes or opens the switch 35 or 36. These switches are spring operated.

The counterweight 40 presses the guide roller 39 against the edge of the fabric 4. If the fabric gives a little, the shaft 38 on which the roller is mounted closes the switch 35. This causes the motor 26 to rotate in such a direction as to drive the nut 17 to the right (Fig. 3) so as to keep the guide roller riding along the edge of the fabric. If, on the other hand, the fabric widens somewhat or shifts to the left, the guide roller 39 is lifted to the left, and this closes the microswitch 36. This rotates the motor in the opposite direction and causes the nut 17 to move the carriage 12 to the left. The adjustment of the set screws 35' and 36' is such that the slightest deviation in the position of the edges of the fabric 4—for example, a deviation as small as .002 inch—is corrected by closing the microswitches and causing the carriage 12 to move to the right or left. The guide roller 39 is at all times kept in touching contact with the edge of the fabric.

The knife 10 is supported by the knife bracket 43, which is fastened to the nut 44 which, in turn, is supported on the threaded shaft 45. The bar 46 presses down on the shaft 47 which extends from the rear of the nut 44. This bar 46 is pressed down by the springs 49 which are housed in the cylinders 50, and the bar is free to move up and down in the slots 51 therein. With this arrangement the springs 49 maintain the knife 10 against the calender roll 3 under a slight pressure at all times while permitting the knife to be moved away from the calender roll against the pressure of the spring 49 when required. By removing the bar 46, the knife drops down away from the calender roll.

The tie rods 14 and 15 and the threaded shaft 18 are supported at each end by plates 55 which are adjustably supported (vertically and longitudinally) by the set screws 56 which are threaded into the upper and lower horizontal portions of the channel 57 which is fastened to the frame 58 of the calender in any suitable manner. The whole trimming device may be removed from the calender by simply loosening the set screws 56 and sliding the plates 55 out of the channels 57.

In operating the equipment, the position of the counter-weights 40 on the shafts 38 (Fig. 2) will depend upon the stiffness of the fabric 4. If the fabric is a light-weight fabric, for example, such as that ordinarily used for breaker strips, the counterweights 40 will be set close up on the shafts 38, and the position of the knives 10 with relation to the guide rollers will be adjusted by turning the shafts 45 by means of the worms 64 and gears 65 so that the knives will not be directly in line with the inside edges of the rollers 39 (as shown in Fig. 2) but will be somewhat outside of these. In treating stiffer fabric, the counterweights will be moved farther out, and by turning the shafts 45, the knives 10 will be brought more in line with the inside edges of the guide rollers 39. The relative positions of the inside edges of the guide rollers 39 and the knives 10 are thus adjustable. The pressure of the rollers 39 against the fabric is also adjustable by changing the positions of the counterweights 40. By these adjustments the positions of the knives are so regulated that they trim the sheet of rubber 11 on the calender roll 3 so that its edges will just coincide with the edges of the fabric 4 as the two enter the bite of the calender rolls 3 and 5. In passing between the rolls, the trimmed width of rubber is calendered onto the fabric and thus removed from the calender roll 3. The strips of rubber trimmed from each side of the sheet by the action of the knives are rolled up as excess trim on the rolls 66 which are revolved by contact with the roll 3.

If the rubber sheet is to be cut narrower or wider than the fabric, the knives are suitably adjusted by turning the worms 64 and shafts 45. In this way the rubber sheet is cut narrower or wider than the fabric, but with the edge of the rubber sheet paralleling the edge of the fabric at all times, as they enter between the calender rolls.

It will be understood that instead of having the whole carriage move, it is only necessary to have the knife and the guide roller 39 move laterally across the face of the calender roll. Furthermore, it is to be understood that instead of a guide roller an electric eye or other suitable means may be used for following the edge of the fabric and moving the knife so that it cuts the sheet of rubber so that its edge exactly coincides with the edge of the fabric as the two enter the bite of the calender rolls. Instead of cloth, other fabric, such as paper or the like, may be similarly treated; and instead of rubber, a synthetic rubber or other plastic may be similarly utilized.

What I claim is:

1. An improved calender for the treatment of fabric with plastic which comprises an intermediate calender roll, means on the feed side of the calender adjacent the bite formed by said calender roll for trimming the plastic while in sheeted form on said calender roll, means for locating an edge of the fabric just before it enters the bite, and means operated by said locating means for moving said trimming means laterally across said calender roll to both sides of the fabric edge so as to make the trimmed edge of the plastic parallel with said edge of the fabric in the bite.

2. A calender equipped with apparatus for trimming a plastic on the surface of a roll thereof, which apparatus includes toward each end of the roll a carriage adapted to move longitudinally of the roll, a knife supported by each carriage for trimming the plastic, also supported by the respective carriages means for locating the respective edge of the fabric just before it enters the bite formed by said roll and an adjacent roll, and means actuated by said locating means for moving each carriage to cause the knife to trim the plastic so the edges of the plastic are closer together than the edges of the fabric as they enter the bite.

3. The method of coating fabric with a rubber which comprises continuously moving the fabric lengthwise past a line along which the coating takes place, and allowing the fabric to shift from side to side as it passes this line, forming a continuous sheet of a rubber, moving it toward the line along which the coating takes place, and just before it reaches this line trimming the edges so that the edges of the sheet of rubber and the respective edges of the fabric are substantially parallel to one another as they reach the line, and then as the fabric and the sheet of rubber reach the line pressing them together so as to coat the fabric.

4. The method of coating fabric with a rubber which comprises continuously moving the fabric lengthwise past a line along which the coating takes place, and allowing the fabric to shift from side to side as it passes this line, forming a continuous sheet of a rubber, moving it toward the line, and just before it reaches the line trimming both edges so that the edges of the sheet of rubber and the respective edges of the fabric are substantially parallel to one another as they reach the line, but trimming the sheet of rubber narrower than the fabric, and then as the fabric and rubber reach the line pressing them together to form a sheet, a part of which is coated, but along at least one edge of which there is an uncoated strip of substantially uniform width.

GEORGE B. NICHOLS.

REFERENCES CITED

The following references are of record in the file of this patent:

UNITED STATES PATENTS

| Number | Name | Date |
|---|---|---|
| 1,402,160 | Gwozdz | Jan. 3, 1922 |
| 1,600,697 | Noonan | Sept. 21, 1926 |
| 1,742,777 | Midgley | Jan. 7, 1930 |
| 1,760,879 | Maynard | June 3, 1930 |
| 1,867,875 | Buchanan | July 19, 1932 |
| 1,762,826 | Lehman | June 10, 1930 |
| 1,133,297 | Lewis | Mar. 30, 1915 |
| 1,333,588 | Lewis | Mar. 9, 1920 |
| 1,306,642 | Stevens | June 10, 1919 |
| 1,468,396 | Putt | Sept. 18, 1923 |
| 1,281,373 | Holmes | Oct. 15, 1918 |
| 1,602,373 | Bowen | Oct. 12, 1926 |
| 1,724,208 | Lewis | Aug. 13, 1929 |

OTHER REFERENCES

Pearson's "Rubber Machinery," New York, 1915, page 107. (Copy in Div. 38.)

Certificate of Correction

Patent No. 2,436,446. February 24, 1948.

GEORGE B. NICHOLS

It is hereby certified that error appears in the printed specification of the above numbered patent requiring correction as follows: Column 5, line 12, for the word "edge" read *edges*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*